Jan. 18, 1938.                P. POLSTER                    2,106,015
                      AUTOMOBILE LICENSE PLATE HOLDER
                          Filed May 17, 1937            2 Sheets—Sheet 1
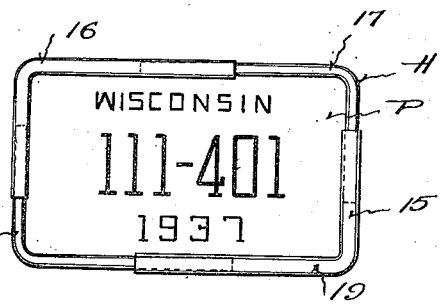
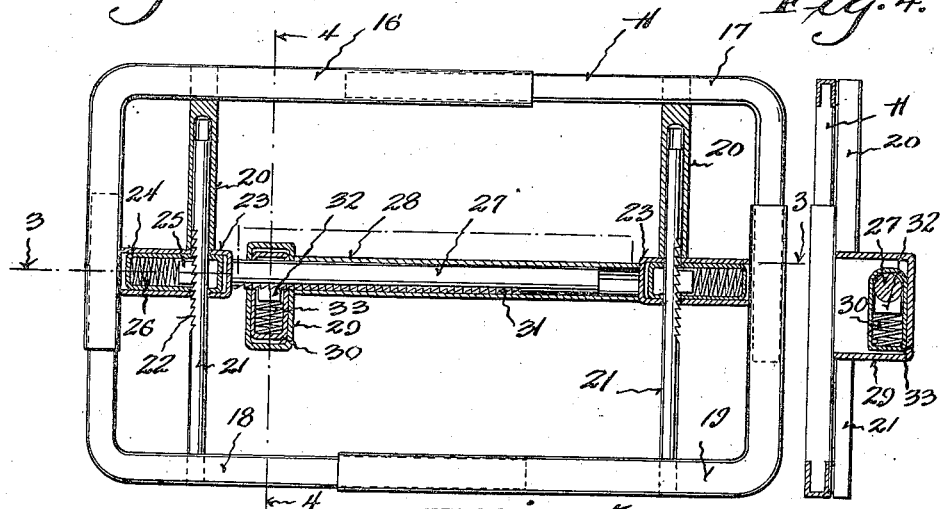
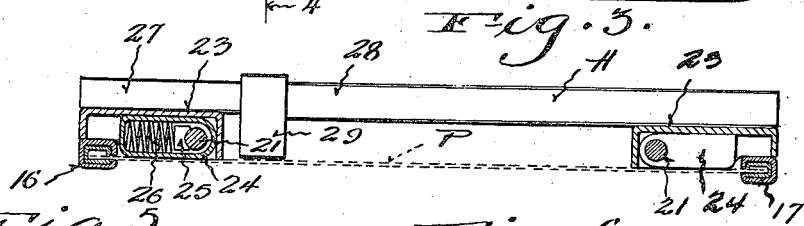
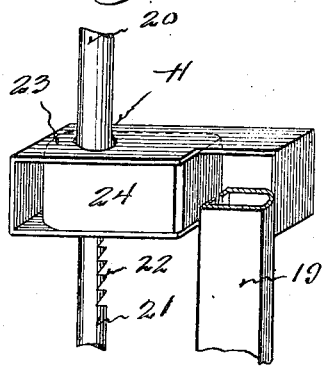
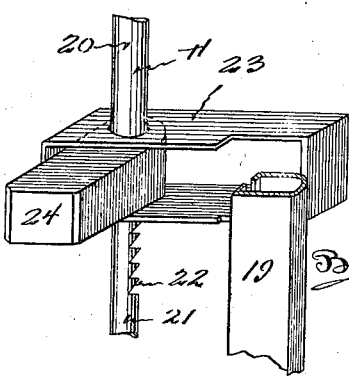

Jan. 18, 1938.   P. POLSTER   2,106,015
AUTOMOBILE LICENSE PLATE HOLDER
Filed May 17, 1937   2 Sheets-Sheet 2
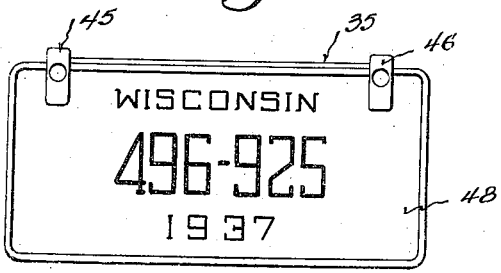
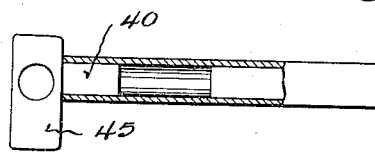
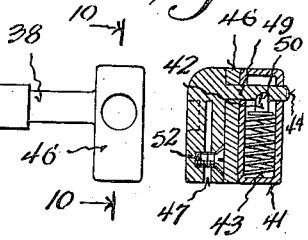
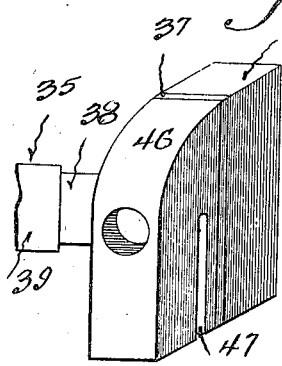
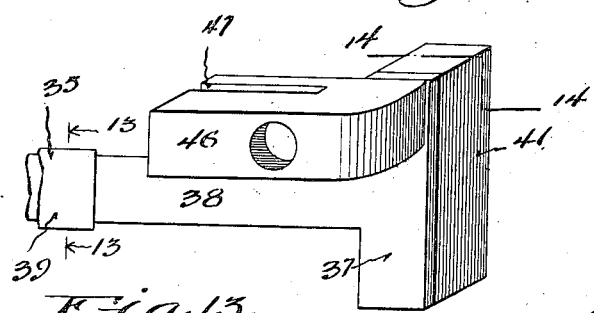
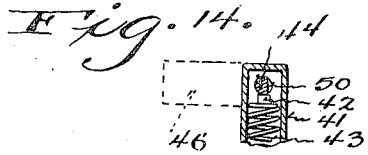
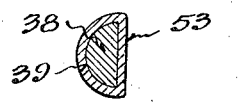

Patented Jan. 18, 1938

2,106,015

UNITED STATES PATENT OFFICE 2,106,015

AUTOMOBILE LICENSE PLATE HOLDER

Philip Polster, Waupun, Wis.

Application May 17, 1937, Serial No. 143,100

3 Claims. (Cl. 40—125)

This invention appertains to motor vehicle attachments, and more particularly to a novel holder or bracket for the license plates of automobiles.

It has become the practice of unscrupulous persons to change the license plates on their automobiles to suit their convenience. This makes it exceedingly difficult for the police to trace cars used by criminals.

Therefore, one of the primary objects of my invention is to provide a novel means for securing a license plate to its holder or bracket in such a manner that the plate cannot be removed without the mutilation thereof, so that the same cannot be used again.

Another salient object of my invention is the provision of a frame embodying a plurality of slidably connected sections for snugly fitting about a license plate, with means for preventing the outward sliding of the sections, whereby the plate cannot be removed from the frame without mutilation thereof.

A further object of my invention is the provision of means for holding the sections of the telescoping frame against separation, which will be exposed to view and manually operable when the license plate is not associated with the frame, whereby the frame can be extended to a decided size for receiving a plate, the plate hiding and covering said means when the plate is fitted in the frame, whereby said means cannot be reached for manual manipulation to release the plate.

A further important object of my invention is to provide an extensible bracket for license plates having removable clips for receiving the plate, with means for securing the clips to the bracket against movement and operation when the clips and the plate are associated with the bracket, whereby the plate will have to be destroyed before the clips can be detached from the bracket.

With these and other objects in view, the invention consists in the novel construction, arrangement, and formation of parts, as will be hereinafter more specifically described, claimed, and illustrated in the accompanying drawings, in which drawings:

Figure 1 is a front elevation of my improved license plate holder, showing a license plate associated therewith.

Figure 2 is a front elevation of the holder with the plate removed, parts of the holder being shown broken away and in section to illustrate structural details, the view being on a larger scale than Figure 1.

Figure 3 is a longitudinal section through the license plate holder taken substantially on the line 3—3 of Figure 2, looking in the direction of the arrows, the license plate being shown in dotted lines.

Figure 4 is a transverse section through the holder, taken substantially on the line 4—4 of Figure 2, looking in the direction of the arrows.

Figure 5 is an enlarged, detail, fragmentary perspective view showing the position of one of the locking members for preventing opening movement of the holding frame.

Figure 6 is a similar view, but showing the latching member in its inoperative position to permit the frame to be extended.

Figure 7 is a front elevation of a modified form of my improved license plate holder, showing the plate held thereby.

Figure 8 is a front elevation of the modified form of holder with the plate removed, parts of the holder being shown broken away and in section, the view being taken on a larger scale than Figure 7.

Figure 9 is a top plan view of the modified form of the holder, with parts thereof broken away and in section, the license plate being shown in dotted lines.

Figure 10 is a detail vertical section through the holder taken on the line 10—10 of Figure 8, looking in the direction of the arrows.

Figure 11 is an enlarged, fragmentary, detail perspective view showing one end of the modified form of the holder, the clip being shown in its normal operative position.

Figure 12 is a view similar to Figure 11, but showing the clip in its raised swung position to permit the removal thereof from the bracket.

Figure 13 is a detail, transverse sectional view taken on the line 13—13 of Figure 12.

Figure 14 is a detail sectional view taken on the line 14—14 of Figure 12, showing the position of the holding latch or dog and the pin carried by a plate clip, when the plate clip is swung to a raised position.

Referring to the drawings in detail wherein similar reference characters designate corresponding parts throughout the several views, the letter H generally indicates my improved holder for a license plate P. The holder H includes an extensible frame 15 embodying a plurality of telescoping sections 16, 17, 18, and 19. These sections form the corners of the frame, and the legs of the sections telescope one within the other and are of a substantially U-shape in cross-section, so that the edge of the license plate P can be inserted therein.

To associate a license plate with the frame, it is merely necessary to pull the sections apart and place a license plate therein, after which the frame can be collapsed by sliding the sections one upon the other until the frame firmly engages the marginal edge of the plate. My invention comprehends novel means for preventing the separation of the sections after the plate has been associated with the frame, whereby it will be necessary to destroy the license plate before the same can be removed.

In accordance with my invention the two upper corner frame sections 16 and 17 have rigidly connected thereto depending tubes or sleeves 20, which slidably receive rods 21. These rods 21 are rigidly connected to the lower frame sections 18 and 19 and have formed thereon along one edge, rack teeth 22. The inner ends of the tubes or sleeves 20 have firmly united thereto by welding or the like rigid housings 23. These housings receive casings 24, which are freely rotatable on the rods 21, whereby the casing can be swung out of the housings 23.

The casings 24 slidably receive latch dogs 25, which are normally urged by means of springs 26 toward the rods 21 and the rack teeth 22 formed on said rods. By referring to Figure 3, it can be seen that the front portions of the housings 23 are left open, whereby the casings carrying the dogs can be reached by a suitable tool to permit the outward swinging movement thereof on the rods. When the casings are in the housings, as shown in Figures 2, 3, and 5, the latch dogs 25 mesh with the rack teeth 22, which hold the frame sections 16 and 17 from being pulled away from the frame sections 18 and 19; but, obviously, due to the direction of the teeth, these frame sections can be slid toward one another.

To prevent the pulling apart of the sections 16 and 18 relative to the sections 17 and 19, the housing 23 of section 16 has rigidly secured thereto a slide rod 27, which is received within a longitudinally extending tube or sleeve 28 rigidly secured to the opposite housing 23, which is adjacent to the frame sections 17 and 19.

The inner end of the tube or sleeve 28 has formed thereon or rigidly secured thereto a laterally extending housing 29 in which is mounted a casing 30. The front end of the housing 29 is left open, as shown in Figure 4, and the casing 30 is mounted for rocking movement on the rod 27. This rod has formed in its lower face a plurality of rack teeth 31, which are adapted to be engaged by a toothed dog 32. The dog is normally urged toward the rack teeth 31 by a coil spring 33, which is housed within the casing. By swinging out the lower end of the casing through the open end of the housing 29, the dog can be moved out of engagement with the rack teeth 31 and alongside a smooth face of the rod 27, whereby to permit the longitudinal adjustment of the sections.

In operation of my improved holder, all of the casings are swung out of their housings and the frame sections are pulled out to an extended position large enough to receive a license plate, after which the casings are all swung into their housings, so that the latch dogs will engage the teeth of their respective rods. The license plate is now placed in the frame, and the frame sections are slid toward one another until the frame is snugly fitted about the plate.

Obviously, the plate sections cannot now be pulled apart in view of the engagement of the ratchet dogs with the ratchet teeth. Hence, in order to remove the plate, it is necessary to cut the same in order to swing the casings out of the housings. The plate sections can be formed from tubing bent into the desired shape and slotted to receive the marginal edges of the license plate or tag.

In practice, it is proposed to weld or otherwise permanently secure the sleeve or tube 28 to a rigid part of the automobile frame, whereby said tube or sleeve will form a rigid part of the automobile.

In Figures 7 to 14 inclusive I have shown another form of my invention, and in this form I utilize a bracket 35. The bracket 35 is made extensible so that license plates of different lengths can be conveniently held. The bracket 35 includes end T-shaped heads 36 and 37. The head 37 has formed thereon or welded thereto the outwardly extending rod 38, which is slidably mounted within an elongated tube or sleeve 39. This sleeve 39 is rigidly secured to the head 36, and, as shown, the head 36 has formed thereon a laterally extending plug 40, which is fitted within the sleeve, and this plug can be welded or riveted to the sleeve so as to form a part thereof.

From the construction so far, it can be seen that the heads 36 and 37 can be moved toward and away from one another by sliding the rod 38 in the sleeve 39. The rear faces of the heads 36 and 37 have rigidly secured thereto by welding or the like closed casings 41 in which are housed latch dogs 42. These dogs are normally urged to a raised position by coil springs 43 confined within said housings. The heads 36 and 37 and the housings 41 have formed therein alined openings 44, for a purpose which will be later set forth.

Detachably associated with the heads 36 and 37 are removable license plate-carrying clips 45 and 46. These clips can be of a solid construction and are slotted, as at 47, to receive the upper edge of a license plate 48, which is to be supported. The upper inner faces of the clips 45 and 46 carry rigid pins 49, which are movable through the openings 44, and the lower faces of these pins or studs 49 have formed therein keeper sockets 50.

When the clips are associated with the heads by pushing the pins 49 through the openings, the dogs or latches 42 will engage in the keeper openings 50 and hold the clips against being pulled away from the heads. However, by swinging the clips to a raised position, as shown in Figure 12, the latch or dog 42 will ride out of the keeper recesses 50 and engage the smooth outer face of a pin, as shown in Figure 14, which will permit a clip to be pulled away from its head.

In use of my improved appliance, a plate 48 is inserted in the slots 47 of the clips 45 and 46, and screws 52 are threaded through the rear faces of the clips and through the license plate. The heads are now slid to the desired position and the clips are placed on the heads by pushing the pins 49 into the openings until the latches or dogs 42 snap into the keeper recesses 50. At this time, removal of the clips and the license plate is prevented. As the screws 52 are hid by the heads 45 and 46, the license plate is prevented from being removed from the clips.

In order to remove the license plate, it is necessary to cut the tag or plate 48 in such a manner that the plate portions can be swung with the clips 45 and 46 until the latches or dogs are sprung out of the keeper recesses. The clips can now be pulled away from the heads and the screws 52 can be readily unthreaded from the tags and the clips.

The sleeve 39 is adapted to be welded or otherwise rigidly secured to a part of the frame of the automobile so as to form an inseparable part thereof. As shown in Figure 13 of the drawings, it is preferred to have the sleeve and rod flattened, as at 53, so that turning of these members relative to one another will be prevented.

Finger-holds are formed in the outer faces of the clips 45 and 46 to facilitate the manipulation of said clips.

Changes in details may be made without departing from the spirit or the scope of my invention, but what I claim as new is:

1. A holder for the license plates of automobiles comprising, a frame including a plurality of sections slidably connected together, said sections being of a U-shape in cross-section to receive the marginal edge of a plate, automatic means for preventing the separation of the sections after the sections have been slid toward one another to an adjusted position, manual means for rendering the automatic means inoperable, said manual means being so constructed and arranged as to be inaccessible when a plate is in the frame.

2. A holder for the license plates of automobiles comprising, a frame including a plurality of slidably connected sections movable toward and away from one another, the sections being of a U-shape in cross-section to receive a license plate, housings carried by certain of the sections, rack bars carried by certain other of the sections slidably extending through the housings, spring-pressed latch dogs carried by the housings for engaging the teeth of the rack bars to prevent separation of the sections, means for manipulating the dogs before a license plate is associated with the frame, the housings being arranged in rear of the frame and adapted to be closed by a license plate, whereby manual operation of the dogs will be prevented when a license plate is associated with the frame.

3. A holder for the license plates of automobiles comprising, an open frame including a plurality of slidably connected sections movable toward and away from one another, the sections being of a U-shape in cross-section to receive the marginal edge of a license plate, inwardly extending sleeves carried by certain of the sections, inwardly extending rods rigidly carried by certain other of the sections and slidably mounted in the sleeves, rigid housings secured to the sleeves receiving the rods, the front portions of said housings being open and adapted to be closed by a license plate when the same is associated with the frame, a casing received within each housing and rotatably mounted on a rod, each of the rods being provided on one side with ratchet teeth, spring-pressed ratchet dogs in the casing normally urged into engagement with the ratchet teeth, the casings being movable on the rods out of the housings for disposing the dogs away from the ratchet teeth, whereby the sections of the frame can be slid away from one another.

PHILIP POLSTER.